Sept. 18, 1956  J. P. MORAN  2,763,451
APPARATUS FOR RELEASING AN AVIATOR FROM
A SAFETY HARNESS CONNECTION WITH A SEAT
Filed Oct. 5, 1953  3 Sheets-Sheet 1

INVENTOR.
John P. Moran
BY
Clayton L. Jenks
ATTORNEY

Sept. 18, 1956          J. P. MORAN          2,763,451
APPARATUS FOR RELEASING AN AVIATOR FROM
A SAFETY HARNESS CONNECTION WITH A SEAT
Filed Oct. 5, 1953                                    3 Sheets-Sheet 2
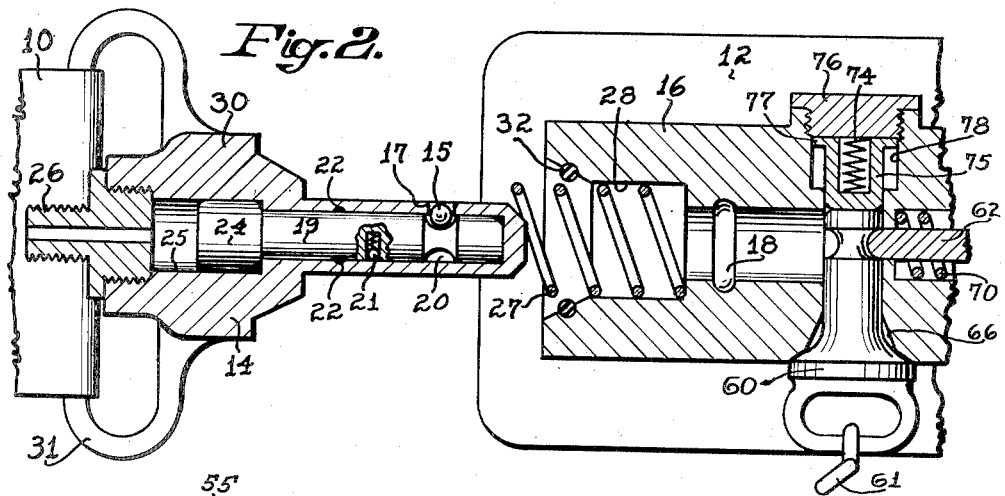
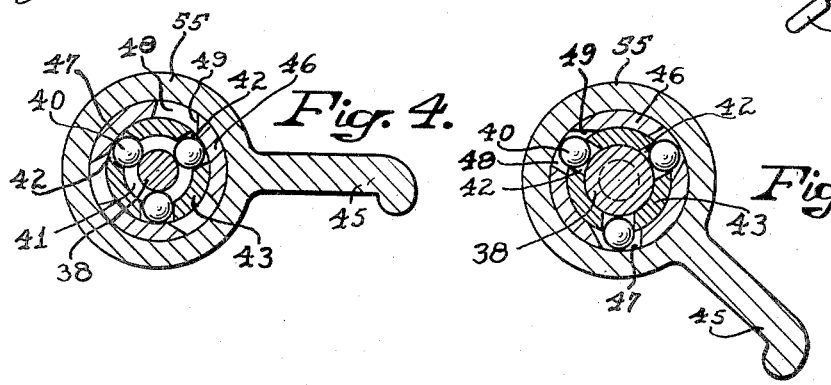
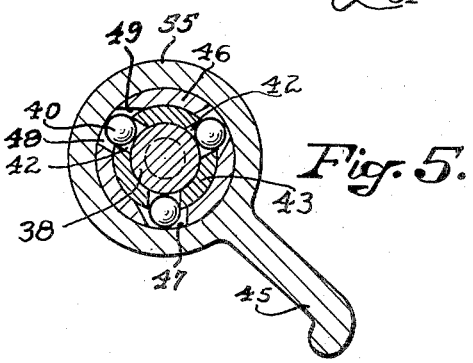
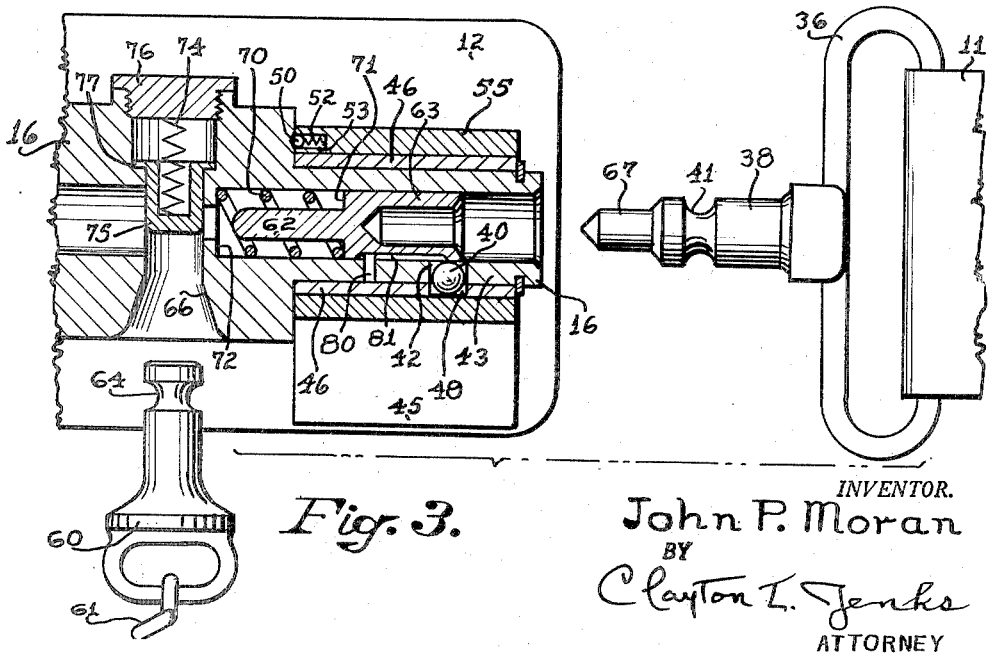
INVENTOR.
John P. Moran
BY
Clayton L. Jenks
ATTORNEY INVENTOR.
John P. Moran
BY
Clayton L. Jenks
ATTORNEY United States Patent Office 2,763,451
Patented Sept. 18, 1956

2,763,451

APPARATUS FOR RELEASING AN AVIATOR FROM A SAFETY HARNESS CONNECTION WITH A SEAT

John P. Moran, Ashland, Mass.

Application October 5, 1953, Serial No. 384,151

19 Claims. (Cl. 244—122)

My invention relates to an apparatus for disconnecting a safety harness, and more particularly for releasing an aircraft crew member from a harness which secures him to a seat.

In certain types of aircraft, an aviator or crew member is secured to the seat by means of a safety harness which is arranged both to hold his shoulders relative to the seat back and to restrain the pelvic regions from sliding forward. If it becomes necessary for the crew member to bail out, automatic devices are provided both to remove the transparent dome overhead and to eject the seat and crew member thereon from the craft.

One object of my invention is to provide apparatus whereby the crew member may be released from connection with the seat and to leave him free for transportation by his parachute, and particularly for his release from a pelvic restraining belt and a harness holding his shoulders positioned relative to the seat.

If the crew member should be disabled or temporarily black out or be incapable of conscious effort due to the sudden and violent effect of ejection from the plane while traveling at high speed, it is desirable that this apparatus be under the crew member's control and yet operate automatically if necessary to release the man from connection with the seat.

A further object is therefore to provide such apparatus which may be operated either manually or automatically under certain conditions of usage.

A folded parachute is connected to a suitable harness secured to the crew member, and it comprises a rip cord and associated parts so arranged as to release the parachute and cause it to support the man. The harness ordinarily carries a suitable device fastened thereto which the crew member may operate, after he leaves the plane, to pull the rip cord and release the parachute. If, however, the crew member is unconscious or disabled, it is imperative that there be an automatic provision for pulling the rip cord and releasing the parachute after the seat and crew member have been ejected from the craft.

A further object of this invention is therefore to provide apparatus which will operate automatically in a timed relationship with the seat ejection and harness releasing operations to pull the rip cord and release the parachute.

The rip cord operation should, however, be normally under the control of the crew member; and a further object is therefore to provide apparatus which may be operated either automatically or manually to release the person from the seat connection and wherein the manual operation may be effected at will and without disturbing the rip cord control mechanism.

Another object of the invention is to provide a key connected for automatically operating the rip cord when the safety belt release is accomplished automatically and which must be assembled in its operative relationship before the safety belt may be connected to secure the aviator or crew member to the aircraft seat.

A still further object is to provide a releasable key which is directly connected to a rip cord control and which must be inserted into the apparatus in an operative position for an automatic control of the rip cord before the aviator may fasten his safety belt or harness and which remains in such an association with the apparatus that, when the operation is automatic, the key is static and pulls the rip cord after the seat and crew member have been ejected from the craft, and wherein the key is so associated with the other parts that it may be manually released from the harness and rendered inoperative or used manually for release of the parachute.

Another object is to provide apparatus of this type which may be operated automatically by the single act of the aviator's causing the seat ejection.

It is found that the safety harness should comprise both a belt and two straps fastened to the seat back which pass over the crew member's shoulders, and that these should be secured by the same releasable mechanism. Hence a further object is to provide a releasable device which simultaneously disconnects two belt ends and releases the shoulder straps, so that in one operation the man is disconnected completely from the seat. Various other objects will be apparent in the following disclosure.

Referring to the drawings illustrating various embodiments of the invention:

Fig. 2 is a fragmentary view, corresponding with the left hand portion of Fig. 1, showing the automatically actuated parts in released positions;

Fig. 3 is a similar fragmentary view of the manually operated parts at the right hand side of Fig. 1 in their released positions;

Fig. 4 is a section on the line 4—4 of Fig. 1 with the ball key parts in locked positions;

Fig. 5 is a similar view with the locking balls in plunger releasing positions;

Figure 1:
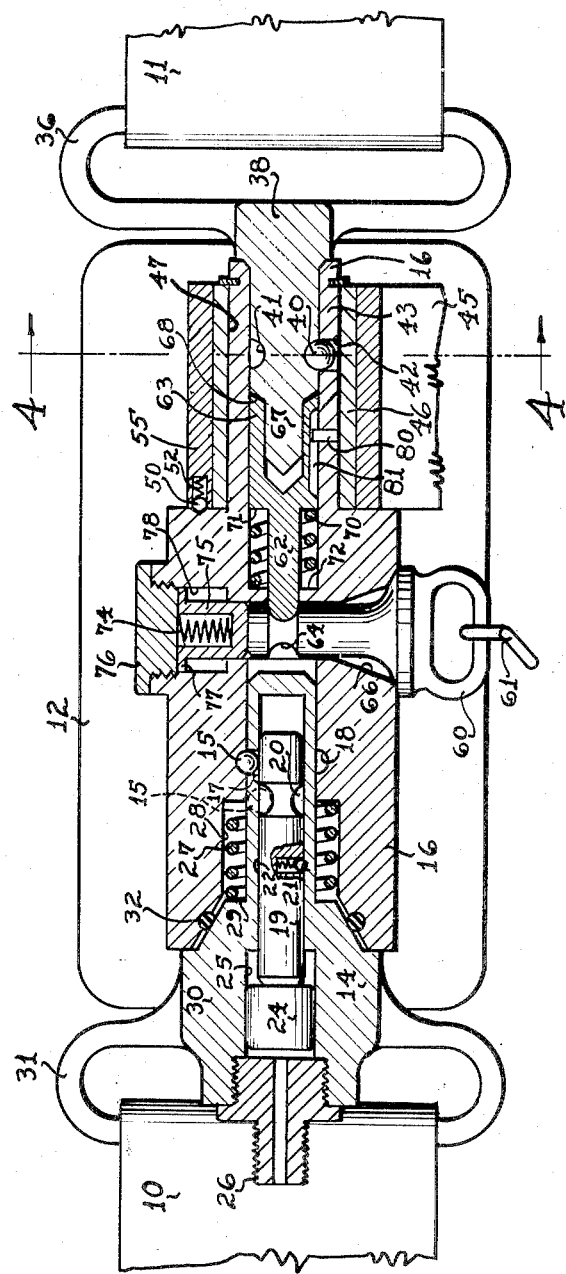
Fig. 1 is a horizontal longitudinal section of the device showing the parts in locked positions and two belt connected plungers releasable at opposite ends of the device.

In accordance with this invention, two straps 10 and 11 of a pelvic restraining belt passing in front of the crew member are separately connected to opposite sides of the seat on which the aviation crew member sits. These belt straps are releasably connected in front of the aviator by an apparatus or device indicated generally by the numeral 12 which has a flat base for engaging the person and is so constructed that the crew member may release the seat straps deliberately and manually, or the belt may be released automatically in timed relation with the ejection of the seat from the aircraft. In the embodiment of Figs. 1 to 5, the strap 10 at the automatically operated end of the apparatus is connected to a slidable locking hollow plunger 14 of substantially cylindrical shape which is releasably locked by means of one or more and preferably three keys, such as the ball keys 15, to a hollow stationary casing member 16 within which the plunger slidably fits. When each key 15, hereafter termed a ball, is in a locking position, it is releasably held in a cylindrical hole 17 through the hollow wall of plunger 14 and within a groove 18 in the inside cylindrical wall of the hollow casing 16. The ball is normally held in place with its center in line with the contiguous cylindrical surfaces of the parts 14 and 16 by resting on the outer cylindrical surface of a movable support, such as the pin 19, which fits slidably within a central cylindrical hollow chamber in the lock plunger 14. As shown in Fig. 1, when the ball 15 rides on the cylindrical surface of the supporting pin 19 it is held in a locking position, since the hollow casing 14 has a thickness equal to the radius of the ball 15 and the rest of the ball must project into the groove 18 of the outer casing 16 which also has a depth equal to the radius of the ball.

In order to release the plunger 14 from its locked relation with the casing 16, the pin 19 is provided with a circumferential groove 20 spaced laterally from the normal locking position of the balls 15. This groove is shaped to fit each ball and its depth, as well as the thickness of the wall of the hollow locked plunger 14, is equal to a radius of the ball 15, so that when the pin 19 has been slid towards the right, the ball 15 will be cammed into the groove 20 and will lie wholly inside of the plunger 14 and out of contact with the outer casing 16, as indicated in dotted lines of Fig. 1 and in Fig. 2. A poppet ball 21 rides in a cylindrical hole in the slidable pin 19 and is pressed by a spring to enter a groove 22 in the plunger 14 and thus to hold the pin 19 and the balls 15 in a locking position. The groove 22 is so shaped that the ball may be cammed readily out of the same when the pin 19 is moved.

The slidable pin 19 is moved to an unlocking position (Fig. 2) by automatic mechanism comprising a piston 24 slidably fitting within the piston chamber 25 and contacting with the end of the pin 19 which may move to force the pin to the right. The piston is moved by gas under compression entering the piston chamber through the central port in a nipple 26 threaded into the enlarged end of the plunger 14 and threaded externally for connection to a pipe line. A helical spring 27, normally held under compression in the spring chamber 28 within the fixed casing 16 around the plunger 14, will eject the locked plunger 14 when the balls 15 have been moved to an unlocked position opposite the groove 20. This spring engages an end wall of the chamber 28 and a shoulder 29 on the enlarged head portion 30 of the plunger 14. This part 30 is integral with the metal loop or eye 31 to which the belt 10 is suitably fastened. That belt eye 31 is located off-center relative to the projecting nozzle 26 so as not to interfere with the gas line connection, as indicated in Fig. 1. The enlarged portion 30 of the lock plunger 14 and the adjacent wall 16 are conically shaped to provide interfitting parts which fit together readily. A sealing O-ring 32 of rubber or the like is inserted in an annular groove in the outer coned portion of the casing 16 to prevent the admission of dust. Likewise, the piston 24 may be provided with an O-ring or otherwise made to insure satisfactory operation.

The slidable pin 19 is of such length that when its right hand end (Fig. 1) is forced against the inner right hand end of the cavity in the lock plunger 14, the balls 15 will be exactly opposite to and are readily cammed into the groove 20. Likewise, it is preferred that the pin 19 and the chamber 25 be of such lengths that the piston 24 will move into contact with the right hand end wall of the chamber 25 when the pin 19 strikes the end of its slideway within the plunger 14. Thus the three distances of movement of pin, piston and ball are made equal so that the balls 15 will surely moved into the releasing groove 20 when the piston is forced towards the right, as by gas generated by an explosive charge. As shown in Fig. 2, after the balls 15 have slid into the annular groove 20 of the slidable pin 19, the spring 27 will eject the lock plunger 14 and the parts associated therewith which connect with the strap 10. This disconnects the belt 10 from the device 12 to which the other strap 11 remains connected and thus releases the crew member from the fastenings attached to the seat. The pin 19 may be suitably moved from the right hand position of Fig. 2 to the left hand position of Fig. 1, as by means of a rod removably threaded into a hole in the end of the pin, similar to the axial hole 127 of Fig. 6. In assembly, and while the plunger 14 is free from the casing 16, the balls 15 are inserted into the groove 20 which is positioned as shown in Fig. 2. After the outer plunger 14 has been thrust into the casing 16, the inner pin 19 is drawn towards the left hand position of Fig. 1 and this serves to cam the balls 15 into their final locking positions.

The belt connection may be manually released by conscious effort of the crew member, by means of the mechanism shown at the right hand side of Fig. 1 and in Fig. 3. In that construction, the belt 11 secured to the seat is connected through a metal eye 36 with a sliding substantially cylindrical plunger 38. This plunger 38 slidably fits within and is releasably connected to the hollow casing 16 by means of one or more and preferably three balls 40. Each ball 40 stands in a locked position in an annular groove 41 in the plunger 38 and in a cylindrical hole 42 through the cylindrical sleeve shaped portion 43 of the casing 16. The depths of the hole 42 and the groove 41 are each equal to the radius of the ball, and the ball 40 in the two parts prevents axial movement of the plunger 38.

The sliding plunger 38 is manually released from inside the casing 16 by means of an external wing shaped lever 45 carried by a sleeve 46 having an inner cylindrical surface rotatably mounted on the outside cylindrical bearing surface of the portion 43 of the casing 16. The sleeve 46 is suitably held against axial movement by a locking retainer ring. The ball keys in holes 42 ride on the inner cylindrical surface 47 of sleeve 46 and so are held thereby in the locking position of Fig. 1. That sleeve 46 has three pockets 48 which are peripherally spaced from the locking positions of the balls and so located and shaped that when the wing lever 45 is struck downwardly by a blow, the sockets 48 are brought around into radial alignment with the balls 40 in the holes 42, and the balls are cammed into those sockets by the rotary action of the sleeve 46 and any axial pull on the plunger 38. For this purpose, the pockets 48 are provided with sloping faces 49 (Figs. 4 and 5) which aid in releasing the balls from their locking positions. When the balls are in the positions of Fig. 4, the plunger 38 is locked against axial or endwise movement, but when the balls are cammed into the sockets 48, they lie wholly outside of the plunger 38 or within the stationary casing 43 and the rotary sleeve 46. Thus, as shown by Fig. 5, the balls have no contact with the sliding plunger 38 and the latter is free to be pulled out of the cylindrical socket of the casing within which it rides. This frees the strap 11 from the rest of the device connected to strap 10, after the plunger 38 has been removed and the connection which holds the aviator locked to the seat is thus broken and he is then free. The lever 45 is held normally in a locked position against accidental rotary movement by means of a spring pressed poppet or ball 50 arranged diametrically between the parallel contiguous faces of the sleeve 46 and the main body 16. The ball 50 lies in a hemispherical groove in an end shoulder face of the casing 16 and is held in that half socket by means of a poppet spring 52 in a cylindrical socket 53 drilled into the end face of the bushing 55. When the sleeve wing 45 is forcibly struck, the ball 50 is crowded back into the socket 53 and thus releases the sleeve for rotary movement. The sleeve 46 is shown as pressed into an outer aluminum bushing 55.

It is required that for certain emergency operations this device be connected through a removable key attached to the rip cord of the parachute. That is, if the aviator succeeds in causing ejection of the seat from the aircraft but is unable to operate the parachute, such as may result from his becoming temporarily unconscious or blacking out at the high speed of ejection, a parachute rip cord should remain connected with the seat. In one type of seat ejecting apparatus, the pilot has manually operable trigger devices on opposite sides of the seat. The first operated device serves to explode a shell and apply gas pressure to remove the transparent dome from above the aviator's head. The second one fires another shell whose explosive force serves to eject the seat and its occupant through the open space of the fuselage. A third shell is located under the seat and its firing pin is connected to a given length of cable carried on the craft so that after the seat has been ejected for a predetermined distance or length of time that firing pin is pulled by the cable and causes the automatic operation of the piston 24 which releases the belt 10.

The key is a metal piece 60 which has a cylindrical stem carrying a head and loop at one end attached to the rip cord 61 that is operatively connected to open the parachute carried by the crew member. This key is intended to remain connected with the casing 16 of the device if the automatic plunger operated release mechanism of Fig. 2 is employed. The key 60 is, however, to be ejected if the belt 11 is released by manual operation of the lever 45, and in that case the key remains attached to the parachute but is unnecessary for its opening, since the aviator has a suitable device attached to his harness that serves that purpose and the key remains for an emergency and is of no use at the moment.

This key 60 is mounted at the central portion of the apparatus between the two releasable plungers 14 and 38. It does not cooperate with the plunger 14, but it is locked in place by a prong 62 on a slidable bushing 63 cooperating with plunger 38. The plug shaped end 62 of the bushing is engageable in an annular groove 64 in the cylindrical stem of the key. That key stem is slidably inserted into a cylindrical opening 66 extending diametrically and transversely of the substantially cylindrical stationary casing 16. This opening is made flaring at the outer end of the key to permit ready insertion of the key.

To lock the key in place, the slidable bushing 63 has its outer end remote from the key groove 64 shaped as a sleeve which surrounds the reduced end 67 of the plunger 38. The bushing fits against a shoulder 68 on the plunger 38 and is slid forward toward the left by pressure from the plunger 38 (Fig. 1) when the parts are to be connected in locking positions. This thrusts the reduced end 62 of the bushing 63 into the groove 64 of the key. When the balls 40 are released into the pockets 48 by the manual operation of the lever 45, the unlocked sliding plunger 38 is ejected by means of a spring 70 which bears against an inner shoulder 71 of the bushing 66 and against the end wall 72 of the stationary housing part 16. This end wall 72 has a hole therethrough which fits and guides the prong into the key groove 64.

The key is ejected from the device by means of a compression coil spring 74 located in a chamber within a hollow plunger 75. The upper end of this chamber is closed by a screw cap 76 suitably threaded into a boss of the casing wall 16. This plunger 75 has a flange 77 riding within an enlarged cylindrical recess 78 formed as a continuation of the keyway 66, and the plunger 75 is shaped to slide downwardly within the slideway 78. The lower end of the plunger fits slidably within the keyway 66. Thus the plunger is moved downwardly by the spring when the plug 62 and bushing 63 are ejected towards the right by spring 70. This frees the key for ejection by spring 74 from the casing.

In order to prevent loss of the slidable bushing 63 when the plunger 38 and key 60 are ejected, the bushing 63 is locked to the fixed casing 16 by means of a pin 80 projecting from the casing into a slide groove 81 in the face of the bushing 63. This groove is long enough to permit the required motion of the bushing to eject the sliding plunger 38 from the casing and free the strap 11 as well as to permit the plunger 38 to push the plug 62 into the socket 64 of the key.

It will be observed by reference to Fig. 3 that the plunger 75 has moved downwardly in the key passage 66 to a position where it closes over the opening in the wall 72 through which the bushing prong 62 was previously inserted into the groove 64 of the key. Thus, when an attempt is made to reassemble the device without the key 60 being present, the plunger 75 prevents the plug 62 from going in far enough to permit the sliding plunger 38 to reach a position where the balls 40 may lock into place in the grooves 41. At the same time the bushing 63 slides forward into the position of Fig. 3 where its outer cylindrical surface holds the balls 40 in the pockets 48 and prevents their being lost. When the plunger 38 connected to the strap 11 is reinserted into the sleeve portion 43 of the casing, the prong 67 of the plunger 38 enters the correspondingly shaped opening inside of the bushing 63. Since the outer surfaces of parts 38 and 63 are cylinders of the same dimension, the plunger 38 then takes on the task of holding the balls in their pockets until the hand operated lever 45 is rotated to bring the openings 42 in the part 43 into alignment with the pockets 48, whereupon the sloping walls of the pockets under the rotary action of the sleeve 46 causes the balls 40 to move up into the locking parts formed by the groove 41 in the plunger 38 and the hole 42 in the sleeve member 43.

This construction provides a safety measure which requires that the crew member first insert the key 60 into the device and force the plunger 75 backwards against the pressure of the spring 74 and so remove that plunger from its position over the opening in the casing wall 72. While he holds the key in its final position and forces the plunger 38 as far as it will go, he rocks the lever 45 to cam the balls into their locking positions, and this permits the plunger to move the prong 62 into the groove in the key 60 and hold the key locked in place. Hence the crew member cannot lock his safety belt parts together until he has inserted the key into its final position, and that key always remains connected to the parachute rip cord.

Figure 6:
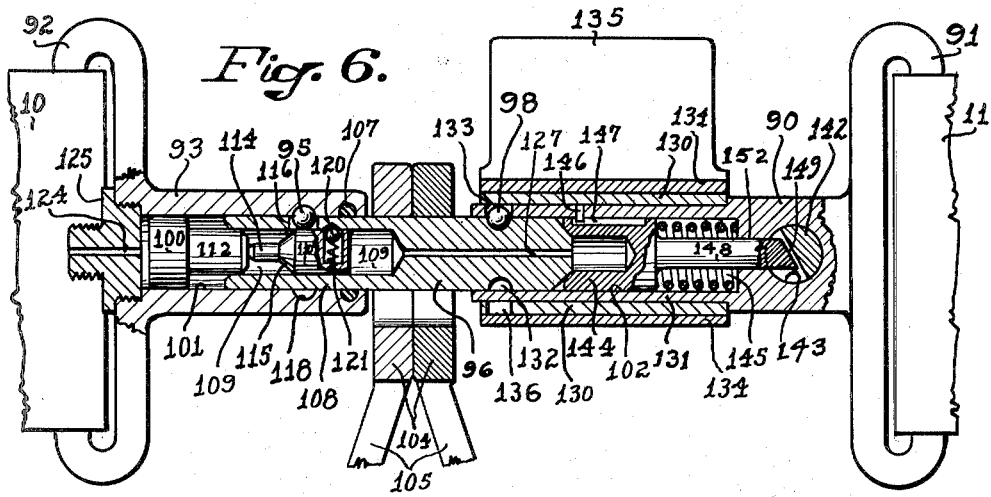
Fig. 6 is a horizontal sectional view of a modification of the device, in which both the automatically and the manually actuated parts are released solely at one end of the device.
Figure 7:
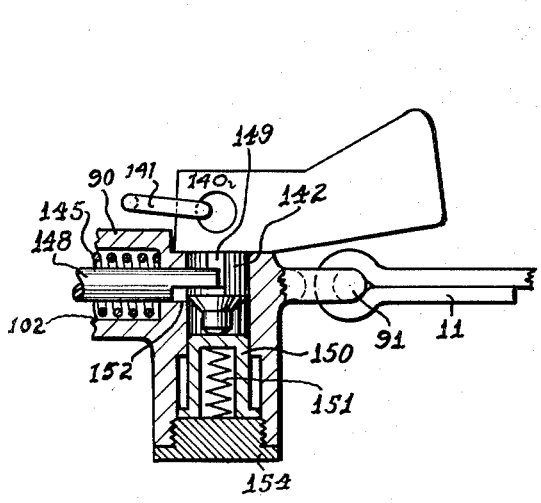
Fig. 7 is a sectional detail of the right hand end of Fig. 6, taken at a right angle thereto, which shows the position of the rip cord key when the belt parts are connected.
Figure 8:
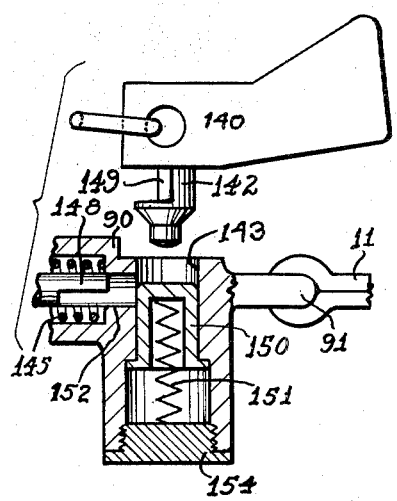
Fig. 8 is a similar view showing the rip cord key released and the parts in positions of preventing re-connection of the belt parts.

In the above construction, the two pelvic restraint belt ends 10 and 11 are fastened to plungers which are releasable in opposite directions toward their belt fastenings. These belt ends are connected across the crew member's abdomen by the releasable linkages. In the construction of Figs. 6 to 8, the belt 11 is permanently fastened to the casing and the belt 10 and an associated plunger is removable from the casing under the operation of either the automatic or the manual controls. In this construction, the casing 90 has a flat metal or loop eye 91 rigidly formed therewith to which the belt end 11 is fastened. The other belt end 10 is secured to a flat metal eye 92 which has a casing 93 shaped as a hollow sleeve-like structure. This part 93 is removably locked by metal balls or keys 95 to an ejectable slide or plunger 96. That plunger is in turn removably locked by balls or keys 98 to the casing 90 to which the other belt 11 is rigidly secured. As in the above described construction, the two belts 10 and 11 are bolted to the seat and the parts 90 and 93 and related parts stay with that seat after ejection of the seat from the aircraft. The two belt connected parts 90 and 93 and their associated plungers form associated slide parts which are releasably keyed together by keys held in place by supports which are movable to positions where the keys are released from their keyways.

The automatic disconnection of the harness belt 10 from the remainder of the device is effected by the construction shown at the left hand end of Fig. 6. This comprises a piston 100 slidably fitted within a cylindrical piston chamber 101 formed on the inside of the sleeve 93 of the belt fastener. The casing 90 at the right hand end of the apparatus likewise has a cylindrical bore 102 of the same diameter as and axially aligned with the piston chamber 101. The plunger 96 is a cylindrical body which slidably fits at one end within the bore 102 of the casing 90 and for a sufficient distance for its support. The left hand end of the plunger 96 slidably fits in the piston chamber 101 in line with the piston 100 but normally out of endwise contact therewith. The only mechanical connection between the two end parts 90 and 93 is through that plunger 96.

Freely mounted on the central portion of that connecting plunger 96 between the parts 90 and 93 are two rings 104 which are respectively connected to straps 105 that pass over the two shoulders of the crew member and are secured at their outer ends to the seat. These straps hold the shoulders of the crew member securely positioned relative to the seat back and prevent him from being thrown forward under any accidental condition. It is necessary that these shoulder fastening straps 105, as well as the straps 10 and 11, be released to free the crew member from the seat. Hence, as an object of this invention, this construction is so made that the shoulder straps 105 are released in either case, whether the belts 10 and 11 are disconnected manually or automatically. That is, if the belt end 92 and sleeve part 93 are removed from the plunger 96, then the strap rings 104 may readily pull off the outer end of the plunger. Likewise, when the plunger 96 is released from connection through the balls 98 with the casing 90, the strap rings 104 are free.

The plunger 96 makes a sliding fit within the cylindrical sleeve 93, and an O-ring 107 may be provided between the parts to seal out dust. The left hand end of the plunger 96 is hollow and shaped as a sleeve 108 to provide a long cylindrical chamber 109 axially concentric with the bore 101 and within which a cylindrical pin 110 is slidably fitted. The piston 100 has a projecting cylindrical stem 112 which slidably fits within the end of the plunger chamber 109. The right hand end of the stem 112 engages a round prong 114 projecting toward the left from the slidable pin 110. This prong 114 provides a space thereabove which has a radial depth as great as the radius of the ball 95, or such that the thickness of the sleeve 108 and the space around the prong 114 equals the diameter of ball 95. The prong 114 has a sloping surface 115 intended to cam each ball 95 outwardly. The sleeve portion 108 of the plunger 96 is provided with a plurality and preferably three equally spaced cylindrical holes 116 of a diameter slightly larger than has the ball 95. The sleeve 93 of the belt fastener is provided with an inside annular groove 118 of substantially the same radial depth as that of the ball 95, and this groove is opposed to the holes 116 which carry the balls in their locking positions.

As shown in Fig. 6, the balls 95 normally ride on the outer peripheral surface of the cylindrical pin 110 and are thus held by that surface in the groove or keyway 118 in a locking arrangement between the parts 93 and 108. A poppet ball 120 is held within a drilled hole in the part 108 by a spring 121 located in a cylindrical hole in the pin 110. Thus the pin 110 is normally held in the position of Fig. 6 against any endwise or axial movement under normal vibrations or impacts of the aircraft. If, however, the piston 100 is driven toward the right within the chamber 101, its stem 112 pressing against prong 114 forces the pin 110 towards the right. The ball keys 95 then ride down the slope 115 or are cammed into the annular space around the prong 114. The thickness of the sleeve portion 108 of the plunger 96 relative to the depth of the space around the prong 114 is such that each ball 95, when it moves down onto the periphery of the prong 114, will be wholly out of contact with the keyway in the outer sleeve member 93 and thus will free that part and the belt 10 from locking engagement with the sleeve end 108 of the plunger 96. This frees the belt 10 from the device.

The piston 100 is driven toward the right similar to the operation of the device of Fig. 1, by means of gas under pressure from a suitable source, such as a delay initiated or an explosive shell, the gas entering the port 124 in a suitable nipple 125 connected with an outside gas tube. After the pin 110 has moved to release the balls into the space on top of the prong 114, the reaction of the gas pressure will aid in blowing the sleeve part 93 toward the left and off the end of the plunger 96. This releases the belt strap 10 from the connecting device and at the same time allows the rings 104 to slide off the end of the plunger 96, thus freeing the crew member from the various connecting straps.

The prong 114 aids in assembling the device, since the balls 95 can be placed in the holes 116 in the sleeve 108 while the pin 110 and the piston 100 are so located that the balls may fall down onto the prong 114. The sloping surface 115 adjacent the prong 114 serves to cam the balls back into locking engagement with the annular groove 118 in the part 93 when the pin 110 is shoved towards the left and until the poppet ball 120 comes into the right location. This assembly may be accomplished by an instrument inserted in the axial hole 127 in the plunger 96 before the plunger 96 is assembled in the belt connected sleeve 93.

The manual locking and release of the locking balls or keys 98 from an associated keyway is effected by a mechanism similar to that shown in Figs. 1 and 3. In this construction, a steel sleeve 130 has its inner cylindrical surface rockingly mounted on an external cylindrical surface of the sleeve shaped portion 131 of the casing 90. That sleeve has a thickness of about half the radius of the ball 98, and the plunger 96 is provided with an annular groove or keyway 132 of that same depth. Each ball is locked in that groove 132 and in a cooperating keyway shaped as a cylindrical hole 133 in the casing part 131. The sleeve 130 is press fitted in an aluminum bushing 134 integral with the wing-shaped hand lever 135. When the sleeve 130 is rocked by the lever 135, each ball 98 is cammed outwardly into a pocket 136 in the sleeve 130, which is constructed the same as is shown in Figs. 4 and 5. This releases the plunger 96 for sliding lengthwise to the left and out of the casing sleeve 131 and so freeing the two straps 10 and 11 from their connected association. In this case, the two strap rings 104 pull off the free end of the plunger 96.

This construction embodies a key 140 similar in its relationships to the key 69 shown in Figs. 1 and 3. The key 140, as shown particularly in Figs. 7 and 8, has a head carrying a ring 141 to which the rip cord is attached. The key has a cylindrical body portion 142 of a size which fits slidably in a cylindrical opening 143 extending transversely through the casing 90. The key and its associated parts, as in the construction of Fig. 1, prevents interconnecting the straps 10 and 11 unless the key has been properly inserted in place. To this end, a cylindrical bushing 144 of the same diameter as the plunger 96 is slidably located in the chamber 102 and arranged to slide beneath the balls 98 and hold them in locking positions when the plunger 96 has been ejected. This sliding of the bushing 144 as well as ejection of plunger 96 is caused by a coiled spring 145 under compression located between the end of the chamber 102 and the bushing. A pin 146 (Fig. 6) in the casing 90 rides in a longitudinal slideway 147 in the bushing and prevents the bushing from moving beyond a position where it can support the balls 98 in their operatively arranged unlocked positions in the pockets 136. The bushing 144 and the plunger 96 are in endwise contact and have juxtaposed faces which form a substantially continuous cylindrical surface, so that the balls are held outwardly when either of the parts 96 and 144 is held beneath the balls. At this time, when the plunger 96 is unlocked the hand lever 135 cannot be moved because of the balls 98 locking the sleeve 130 to the casing part 131.

The bushing 144 has a prong 148 projecting toward the right and adapted to engage a slot 149 in the side of the key 140 which is provided by cutting away the key to a half diameter, as shown. The end of the prong 148 is beveled to fit in the cut-away portion of the key and the lower shoulder of the slot prevents ejection of the key when the straps 10 and 11 are held in their locked together positions. A hollow cylindrical bushing 150 fits slidably in the keyway 143 and a flange on the bushing riding in an enlarged portion of the keyway 143 limits the movement of the bushing. The bushing is urged by a helical compression spring 151 within the bushing towards the position at which it may close off the passage 152 between the chamber 102 and the keyway 143 through which the prong 148 must be inserted. A screw cap 154 suitably threaded on the casing 90 engages the spring 151 within the bushing 150, and the spring under compression urges the bushing 150 towards a position which prevents the prong 148 from being reinserted, unless the key 140 is forced into place to move the bushing 150 back out of the way of the prong 148. Thus it is necessary to put the key 140 into position before the bushing 144 and the plunger 96 can be forced far enough to the right to position the balls 98 opposite the locking groove 132 and permit the hand lever 135 to be rocked to cam the balls into the locking groove 132 where they will lock the plunger 96 to the casing part 131. Upon manual operation of the lever 135, the plunger 96 is forced outwardly toward the left by the spring 145. The intermediate bushing 144 at the same time moves into a position under the balls 98. Thus, when the plunger 96 is released, the key 140 is ejected by its spring 151, and the slidable bushing 150 moves into place to prevent the assembling of the strap connections until the key has been reinserted.

It will now be appreciated that the casing 16 of Fig. 1 and the plunger 96 of Fig. 6 constitutes a central body which is releasably keyed to the outer members secured to the restraining harness belt ends which secure the crew member on the seat. In the Fig. 1 construction, the casing 16 is hollow and the belt end members are plungers slidably keyed within the two ends of the casing. In the Fig. 6 construction, the central body 96 has the two belt end casing parts 90 and 93 made hollow and slidably mounted on the plunger 96. Hence these two constructions may be considered as reversed arrangements having similar characteristics. In both constructions, the automatically moved plunger 19 and the pin 110 form movable supports for releasably holding the ball keys interlocked with the keyways. Also, the manually releasable keying balls 40 and 98 may be considered as held in position by supports comprising the annular members 46 and 130 which are arranged to support the ball keys in interlocking positions and to be moved to positions where the ball keys are released into outer pockets.

It will therefore be appreciated that various modifications may be made in this construction to embody the above principles of structure and operation. Hence the above disclosure of preferred embodiments of the invention is not to be interpreted as imposing limitations on the appended claims.

I claim:

1. An aviation safety apparatus for connecting two harness ends, a casing connected to one end, a plunger connected to the other end, said casing and plunger having associated keyways, a movable key releasably locked in the keyways to secure the plunger to the casing, a movable support for holding the key releasably mounted in the keyways, said casing having a piston chamber, a piston in said chamber for moving said support to a key releasing position, and means for introducing gas under pressure to said chamber to move the piston and release the key.

2. Aviation apparatus for releasably connecting two safety harness ends comprising a casing and a plunger connected respectively to said ends, the casing and plunger having opposed keyways, each being arranged to receive only part of a key, a key releasably mounted in the keyways and connecting the plunger to the casing, a support having a raised portion and a pocket movable to a position where the raised portion holds the key in a locking position in the keyways and alternatively to a position for releasing the key into the pocket, means for holding the support normally in a key locking position and a manually actuated lever connected to move the support and release the key.

3. An aircraft safety harness having connectable belt ends and shoulder straps secured for holding a crew member on a seat comprising two separable parts attached respectively to the belt ends which have opposed keyways, a releasable key in the keyways to interlock said parts, a support movable alternatively to hold the key in an interlocking position and to release the same, means to move the support to cause disconnection of said parts and release the belt ends, and means on the shoulder straps releasably secured at their free ends to the interlocked parts which are released by separation of said parts.

4. An aviation safety harness having two pieces separately connected to an ejectable seat in an aircraft, two connectable parts attached respectively to the free ends of the harness pieces which have opposed keyways, a key removably fitting in the ways to lock the parts together, a movable support for releasably holding the key alternatively in and out of locking positions, an automatically operable device including a piston to move the support and release the key from a locking position, and means for attaching a parachute rip cord to one of said parts which remains connected to the seat and governs the opening of the parachute when said parts have been automatically disconnected.

5. Apparatus for releasably connecting aviation harness ends comprising two relatively separable parts connected respectively to said ends, said parts having opposed keyways, each being arranged to receive only part of a key, means comprising a movable key in said keyways for releasably connecting the parts, a support having a part movable to hold the key in place in the opposed keyways and providing a space for receiving the key to release it for removal of one of said parts, a movable member and a spring to urge it to a position of preventing reassembling the removed part, and an ejectable key which releasably returns said member to a position which permits reassembly.

6. Aviation safety apparatus for connecting two harness ends comprising two relatively separable spaced parts respectively connected to said ends, an intermediate body slidably associated with said parts, said body and each of said parts having opposed keyways, a key releasably mounted in each of the opposed keyways for holding the body releasably connected to both of said parts, separately movable supports for releasably securing each key in its associated keyways, automatically operable means to move one support to release one key and manually operable means to move the other support and release its associated key.

7. Apparatus according to claim 6 comprising an ejectable key connected to a parachute rip cord which is mounted to remain connected to one harness end when the automatically moved support serves to move its associated key and disconnect the harness ends, and means for ejecting the ejectable key when the manually moved support releases its associated key.

8. In aviation safety apparatus having belt ends connected respectively to interfitting relatively separable parts provided with opposed keyways, a releasable key, a movable support for releasably holding the key in the keyways, one of said parts having a transverse opening, and a prong movable with the other part and insertable into said opening, an ejectable key shaped to fit in said opening which has an outer portion for attachment to a parachute rip cord and a groove shaped to interfit with said prong and be thereby held within the casing during normal assembly of the parts.

9. Aviation safety apparatus for connecting two belt ends comprising a hollow casing and a hollow plunger slidably mounted therein which are respectively connected to the belt ends, said casing having a keyway and the plunger a keyway hole opposed to the casing keyway, a releasable key which fits simultaneously into the keyway and hole, a pin slidably mounted within the plunger and having a portion which normally holds the key in the plunger hole for interlocking with the casing keyway, said pin providing a space laterally removed from its normal key supporting portion, and means for moving the pin endwise to cause the key to drop into said space and out of locking engagement with the casing and thereby releasing the plunger.

10. Apparatus according to claim 9 comprising a piston axially aligned with the pin, and means for admitting gas under pressure to cause the piston to move the pin to a key unlocking position.

11. Aviation safety apparatus for releasably securing two belt ends compirsing a hollow casing and a plunger slidably insertable within the casing which are respectively connected to the belt ends, said plunger having a keyway and the casing having a hole opposed to the keyway, a key releasably interlocked in said hole and keyway, an external sleeve movably mounted on the casing which has a pocket normally displaced from the casing hole and movable to a position for receiving the key in the pocket and releasing the plunger from the keyway and a readily accessible handle for moving said sleeve and causing the plunger to be released.

12. Apparatus according to claim 11 in which the casing has a transverse opening and comprising a prong movable with the plunger and projecting into said opening when the plunger is held in a locked position, an interfering member in the transverse opening which normally interferes with assembling the prong and plunger and an ejectable key mountable in said transverse opening for moving said member away from interference with the prong movement which has a groove interlocking with said prong for holding the ejectable key in position.

13. Apparatus according to claim 12 in which the interfering member comprises a slide mounted in said transverse opening and a spring which urges the slide to a position where it obstructs reassembly of the prong in the transverse opening, said ejectable key being shaped to move said slide out of its obstructing position and permit reassembly of the plunger and prong in locking positions.

14. Aviation safety apparatus for connecting two aviation harness belt ends comprising two separable hollow casings respectively connected to the belt ends, a central plunger slidably and releasably mounted within the casings for connecting the same, each of said casings having a keyway for receiving part of a key and the plunger having two keyways opposed repectively to the casing keyways for receiving parts of the associated keys, said keys in said keyways, separately movable supports for holding the keys in their respective keyways in positions which lock the plunger to each casing and separate means for moving each support and removing the associated key from a locking position to release the plunger from the associated casing.

15. Apparatus according to claim 14 in which the casings are spaced and the plunger is exposed centrally therebetween and comprising harness rings slidably mounted on the central portion of the plunger and said rings and plunger having unobstructing slide surfaces so that the rings are releasable when the plunger is separated from a casing.

16. Apparatus according to claim 14 in which the casing has a transverse opening, an ejectable key mounted in said opening which has a locking groove therein, a prong movable with the plunger into the transverse opening and the ejectable key groove which holds the key locked in place when the plunger is locked to the casing, and a resiliently urged slide member in the transverse opening which ejects the ejectable key when the prong is withdrawn, said slide member being positioned to obstruct reentry of the prong prior to reinsertion of the ejectable key.

17. Aviation apparatus for releasably connecting two belt ends comprising a hollow casing, two separate plungers removably insertable in opposite ends of the casing, said casing and plungers having opposed keyways, keys for said keyways, separate supports for holding the keys in position to connect both plungers to the casing and means for moving each support to a position of releasing the keys for separation of the associated plungers from the casing.

18. Apparatus according to claim 17 in which the casing has a transverse opening, an ejectable key insertable in said opening which has a groove, one of the plungers having a prong engaging in said groove and holding the ejectable key in position, and resiliently mounted means for ejecting the ejectable key and obstructing a reentry of the prong into said transverse opening prior to insertion of the ejectable key.

19. An aviation safety harness comprising two releasably secured aviation harness ends, a hollow casing connected to one end, a plunger connected to the other end which is releasably mounted in the casing, the casing and the plunger having opposed keyways each being arranged to receive only a part of a key, a key releasably mounted in the opposed keyways and locking the casing and plunger together, a separate support shaped to hold the key in a locking relationship in the keyways and providing a space for receiving and releasing the key from one keyway, said support being movable relative to the plunger to a position where it releases the key, and a separately movable means for moving the support from a key holding to a key releasing position so that the plunger may be removed from the casing to separate the harness ends.

References Cited in the file of this patent

UNITED STATES PATENTS

| | | |
|---|---|---|
| 1,492,853 | Johnson | May 6, 1924 |
| 1,692,826 | Ganz | Nov. 27, 1928 |
| 2,108,716 | Kuhlemann | Feb. 15, 1938 |
| 2,393,311 | Cunningham | Jan. 22, 1946 |
| 2,481,116 | Horning | Sept. 6, 1949 |

FOREIGN PATENTS

| | | |
|---|---|---|
| 585,274 | Quilter | Feb. 4, 1947 |